A. M. BAIRD.
OXYACETYLENE TORCH.
APPLICATION FILED JULY 28, 1914.
1,116,204.
Patented Nov. 3, 1914.
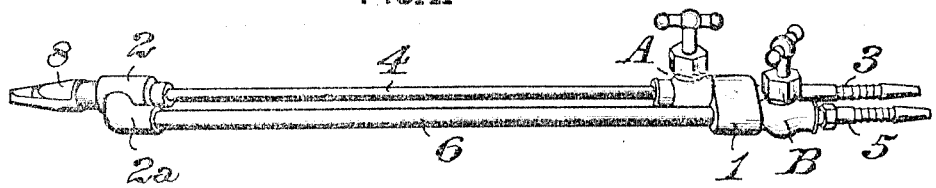
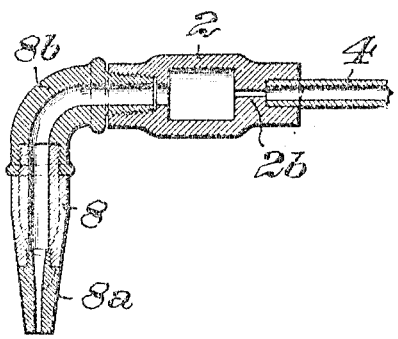
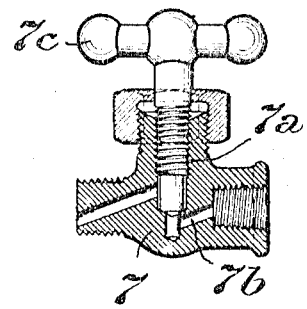
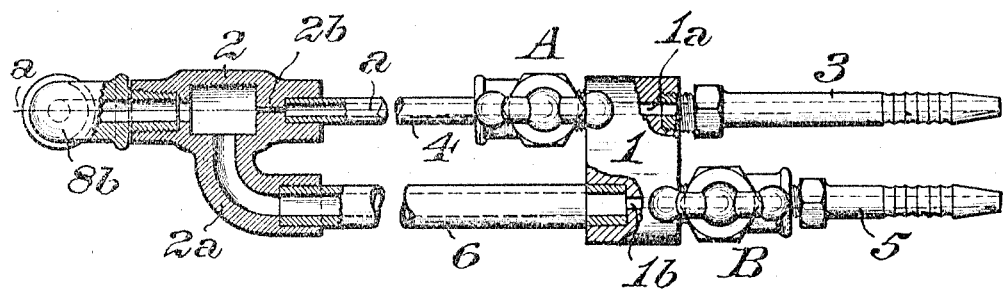
WITNESSES
INVENTOR

UNITED STATES PATENT OFFICE.

ARCHIE M. BAIRD, OF TOPEKA, KANSAS, ASSIGNOR TO JOEL S. COFFIN, OF ENGLEWOOD, NEW JERSEY.

OXYACETYLENE-TORCH.

1,116,204. Specification of Letters Patent. Patented Nov. 3, 1914.

Application filed July 28, 1914. Serial No. 853,581.

*To all whom it may concern:*

Be it known that I, ARCHIE M. BAIRD, a citizen of the United States, and a resident of Topeka, in the county of Shawnee and State of Kansas, have invented a certain new and useful Improvement in Oxyacetylene-Torches, of which improvement the following is a specification.

My invention relates to blow pipe torches used for welding and cutting metal by the combustion of acetylene gas, and its object is to effect a substantial simplification and economization of the construction of an appliance of such type; to reduce liability to leakage; and to enable the change from a right angle to a straight flame delivery, or vice versa, to be readily and expeditiously made whenever required.

The improvement claimed is hereinafter fully set forth.

In the accompanying drawings: Figure 1 is a view, in perspective, of an oxy-acetylene torch, embodying my invention; Fig. 2, a plan view, partly in section and on an enlarged scale, of the torch shown in Fig. 1, with an elbow to project the flame at right angles to the line of the torch; Fig. 3, a vertical longitudinal section through the mixing chamber and discharge nozzle, on the line $a\,a$ of Fig. 2; and, Fig. 4, a central section through a regulating valve.

In the practice of my invention, I provide, at one end of the torch, a connection block, 1, having two parallel ports $1^a$ and $1^b$, extending through it, and, at the other, a mixing chamber, 2, on which there is formed a tubular lateral branch, $2^a$, which is of elbow form and so curved that its outer end portion is parallel with the mixing chamber. An oxygen supply pipe, 3, is screwed into one side of the block, 1, communicating with the port, $1^a$, thereof, and a regulating valve, indicated as an entirety, by A, is screwed into the opposite side of the block, the interior of the body of the valve communicating with the adjoining end of the port, $1^a$. An oxygen delivery pipe, 4, which is usually formed of copper tubing, is secured, by brazing, to the opposite end of the body of the valve, A, and extends therefrom to the mixing chamber, 2, into which it is fitted, and to which it is secured by brazing. The axis of the oxygen delivery pipe is straight and in line with that of the mixing chamber, throughout its length. Communication from the pipe, 4, to the interior of the mixing chamber is effected through a port, $2^b$, in the wall of the chamber, of smaller diameter than the bore of the pipe, 4.

An acetylene supply pipe, 5, is connected to the body of a regulating valve, designated, as an entirety, by B, which is, in turn connected to the connection block, 1, the interior of the valve body communicating with the adjoining end of the port, $1^b$, thereof. An acetylene delivery pipe, 6, preferably formed of brass and of larger diameter than the oxygen delivery pipe, 4, is secured, by brazing, to the connection block, communicating with the end of the port, $1^b$, farther from the regulating valve, B, and extends therefrom to the branch, $2^a$, of the mixing chamber, into which branch it is fitted, and to which it is secured by brazing.

The regulating valves, A and B, are of the "needle" type, and are substantially similar in construction, each comprising a valve body, 7, and a threaded stem, $7^a$, engaging a female thread in the valve body and a conical point controlling a port or passage, $7^b$, leading through the valve body, the stem being rotated for desired adjustments by a hand wheel, $7^c$, on its outer end.

A tubular discharge nozzle, 8, which is fitted with a detachable tip, $8^a$, having an outlet bore of reduced diameter, is secured to the mixing chamber, 2, opposite to, and in line with, the oxygen delivery pipe, 4. As shown in Fig. 1, the discharge nozzle is connected directly to the mixing chamber, thereby effecting a straight flame delivery, *i. e.*, one which is in line with the oxygen delivery pipe, and in Fig. 3, it is shown as connected through the intermediation of an elbow, $8^b$, so as to effect a right angle delivery. It will be seen that a change from one to the other delivery can be readily effected whenever desired.

In the operation of an oxy-acetylene torch embodying my invention, the supply pipes, 3 and 5, having been first connected to suitable sources of oxygen and acetylene gas supply, respectively, the regulating valve, B, of the acetylene pipe line, is opened, and the escaping gas is ignited at the outlet of the discharge nozzle. The regulating valve, A, of the oxygen pipe line, is then opened, and the current of oxygen gas thereby admitted to the mixing chamber, through the small port, $2^b$, is discharged into that of acetylene gas which is supplied to the mixing chamber through the lateral branch, 2ᵉ, thereof, at a right angle to the latter current, the effect of which is to change the form of the flame of the acetylene gas at the outlet of the discharge nozzle, by shortening and narrowing it to the dimensions which have been found to be most desirable for welding purposes. The length of the flame may be increased or decreased, as desired, by proper adjustment of the regulating valve, A, of the oxygen pipe line.

I claim as my invention and desire to secure by Letters Patent:

1. In an oxy-acetylene welding torch, the combination of a connection block having ports, a mixing chamber provided with an end and a side connection having a lateral elbow, oxygen delivery and acetylene delivery pipes leading from ports in said block to the mixing chamber and to the lateral branch, respectively, and extending, parallel, and in line throughout, with said ports, and, respectively, in line with the axes of the receiving ends of the mixing chamber and of its lateral elbow, pipes for supplying oxygen and acetylene gas to the ports of the connection block, and a discharge nozzle connected to the mixing chamber, in line with the oxygen delivery pipe and its connection block port.

2. In an oxy-acetylene welding torch, the combination of a connection block having ports, a mixing chamber having a lateral elbow, an oxygen supply pipe communicating with a port in the connection block, an oxygen delivery pipe leading from said port to the mixing chamber, in line throughout with said port and with the mixing chamber, a needle regulating valve controlling said pipe, an acetylene supply pipe communicating with a second port in the connection block, a needle regulating valve controlling said pipe, an acetylene delivery pipe leading from said port to the lateral elbow of the mixing chamber, and a discharge nozzle connected to the mixing chamber, in line with the oxygen delivery pipe and its connection block port.

ARCHIE M. BAIRD.

Witnesses:
C. A. Wood,
J. G. McEntyre.